(12) United States Patent
Zheng et al.

(10) Patent No.: US 10,313,097 B2
(45) Date of Patent: Jun. 4, 2019

(54) BUFFERLESS RING NETWORK

(71) Applicant: Huawei Technologies Co., Ltd., Shenzhen (CN)

(72) Inventors: Qiaoshi Zheng, Shenzhen (CN); Zhirui Chen, Shenzhen (CN); Jing Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/886,912

(22) Filed: Feb. 2, 2018

(65) Prior Publication Data

US 2018/0227112 A1 Aug. 9, 2018

(30) Foreign Application Priority Data

Feb. 4, 2017 (CN) .......................... 2017 1 0064459

(51) Int. Cl.
| | |
|---|---|
| *H04L 5/22* | (2006.01) |
| *H04Q 11/08* | (2006.01) |
| *G06F 9/30* | (2018.01) |
| *H04L 12/933* | (2013.01) |
| *H04J 3/00* | (2006.01) |
| *H04L 12/70* | (2013.01) |

(52) U.S. Cl.
CPC ............ *H04L 5/22* (2013.01); *G06F 9/30134* (2013.01); *H04J 3/00* (2013.01); *H04L 49/102* (2013.01); *H04Q 11/08* (2013.01); *H04L 2012/5612* (2013.01); *H04L 2012/5675* (2013.01)

(58) Field of Classification Search
USPC ........................................................ 370/460
See application file for complete search history.

(56) References Cited

U.S. PATENT DOCUMENTS

| | | | | |
|---|---|---|---|---|
| 3,328,772 A | * | 6/1967 | Oeters ..................... | G06F 5/085 711/167 |
| 4,389,721 A | * | 6/1983 | Young ................... | H04L 12/423 370/458 |
| 4,916,692 A | * | 4/1990 | Clarke .............. | H04L 12/40013 370/451 |
| 5,420,860 A | * | 5/1995 | Stevens ................. | H04M 3/561 370/263 |
| 2010/0014423 A1 | * | 1/2010 | Furuskar ............... | H04W 74/02 370/235 |

(Continued)

*Primary Examiner* — Gregory B Sefcheck
*Assistant Examiner* — Majid Esmaeilian
(74) *Attorney, Agent, or Firm* — Conley Rose, P.C.

(57) ABSTRACT

A bufferless ring network including at least two nodes and at least two timeslots, the at least two timeslots include a dedicated timeslot, and a first node in the bufferless ring network has use permission for the dedicated timeslot. The first node is configured to, in a state of having the use permission for the dedicated timeslot, detect whether all dedicated timeslots that pass through the first node are available, set a permission switch signal, and cancel the use permission for the dedicated timeslot according to the permission switch signal after detecting that all the dedicated timeslots that pass through the first node are available. A remaining node in the bufferless ring network is configured to obtain the use permission for the dedicated timeslot according to the permission switch signal. The remaining node is a node that needs to use the dedicated timeslot.

8 Claims, 11 Drawing Sheets

(56) References Cited

U.S. PATENT DOCUMENTS

| | | | | |
|---|---|---|---|---|
| 2014/0321853 A1* | 10/2014 | Beshai | ............... | H04Q 11/0005 398/52 |
| 2015/0266324 A1* | 9/2015 | Qu | ........................ | B41J 29/38 347/190 |
| 2016/0191277 A1* | 6/2016 | Li | ....................... | H04L 1/0026 370/465 |
| 2016/0241314 A1* | 8/2016 | Ferrante | ............ | H04W 72/0406 |

* cited by examiner

BUFFERLESS RING NETWORK

CROSS-REFERENCE TO RELATED APPLICATION

This application claims priority to Chinese Patent Application No. 201710064459.1, filed on Feb. 4, 2017, which is hereby incorporated by reference in its entirety.

TECHNICAL FIELD

The present disclosure relates to the field of communications technologies, and in particular, to a bufferless ring network.

BACKGROUND

Figure 1:
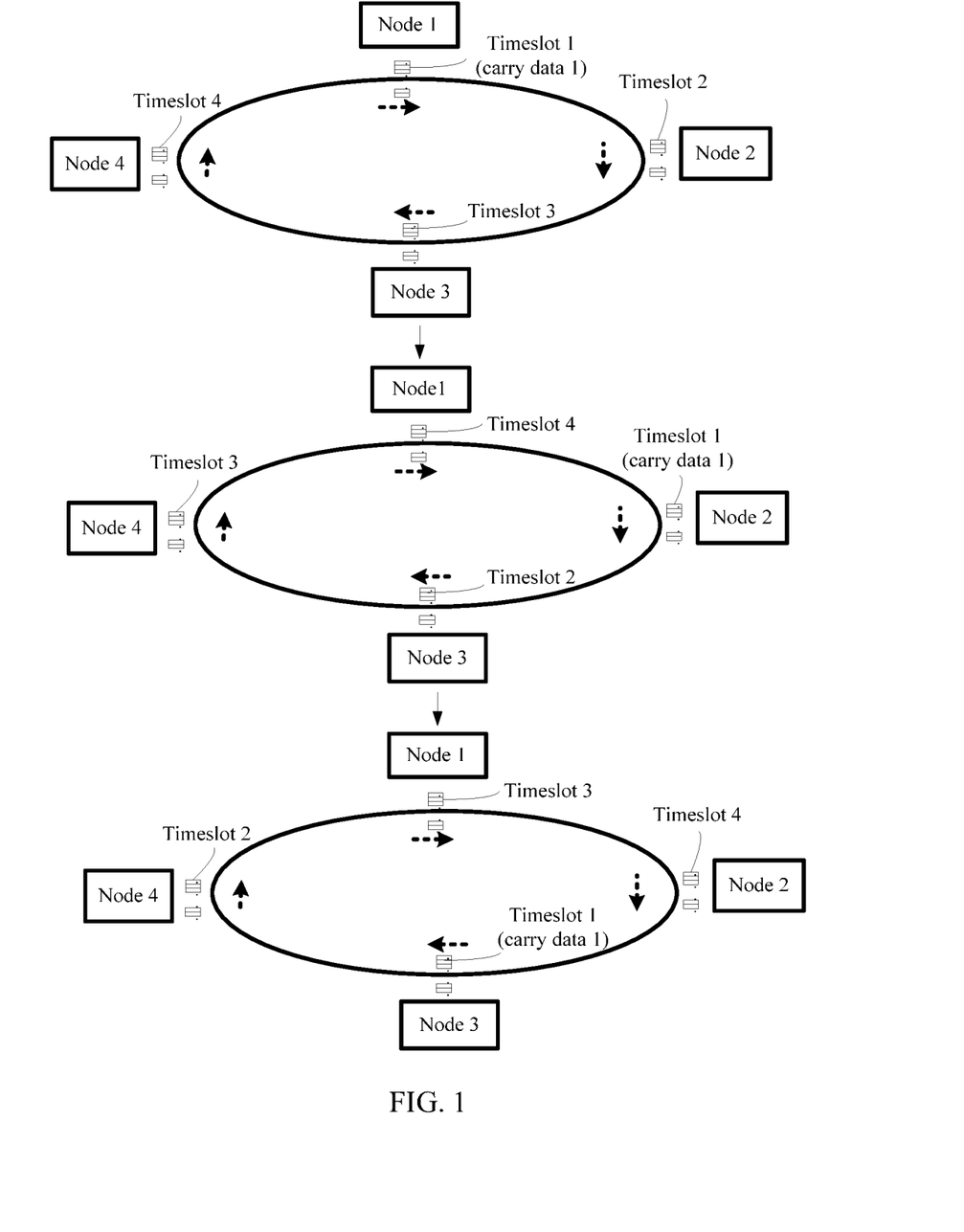
FIG. 1 is a schematic diagram of a bufferless ring network.

A bufferless ring network is a ring network that connects multiple nodes and implements data transfer between the multiple nodes. FIG. 1 is a schematic diagram of a bufferless ring network. As shown in FIG. 1, the bufferless ring network includes four nodes, a node 1 is connected to a node 2, the node 2 is connected to a node 3, the node 3 is connected to a node 4, and the node 4 is connected to the node 1. As shown in FIG. 1, a timeslot (the timeslot is a carrier for transmitting and carrying data) is used to transmit data between the nodes. The timeslot may be transmitted in a clockwise or anticlockwise direction. FIG. 1 shows an example in which the timeslot is transmitted in the clockwise direction. As shown in FIG. 1, if the node 1 needs to transfer data 1 to the node 3, the node 1 adds the data 1 to a currently received timeslot 1, and transfers the timeslot 1 to the node 2. After the node 2 receives the timeslot 1, the node 2 directly transfers the timeslot 1 to the node 3. Then the node 3 receives the data 1. A principle for transferring data between other nodes is the same.

In the bufferless ring network, interdependent data usually needs to be transferred between nodes. For example, completion of transferring the data 1 depends on completion of transferring data 2 (that is, the data 1 can be successfully transferred only after the data 2 is successfully transferred). The data 1 and the data 2 are interdependent data, and the data 2 is depended data. To ensure that depended data is successfully transferred, at least one dedicated timeslot needs to be reserved for each node that needs to send the depended data to transmit the depended data (that is, the dedicated timeslot can be used to transmit only the depended data). More reserved dedicated timeslots indicate a longer message transmission delay.

It is found from practice that a large quantity of nodes need to transmit depended data. Therefore, many dedicated timeslots need to be reserved. This causes a long data transmission delay.

SUMMARY

Embodiments of the present disclosure provide a bufferless ring network, to reduce a quantity of reserved dedicated timeslots and reduce a message transmission delay.

According to a first aspect, an embodiment of the present disclosure discloses a bufferless ring network. The bufferless ring network includes at least two nodes and at least two timeslots, the at least two timeslots include a dedicated timeslot, and a first node in the bufferless ring network has use permission for the dedicated timeslot. The first node is configured to, in a state of having the use permission for the dedicated timeslot, detect whether all dedicated timeslots that pass through the first node are available. The first node is further configured to set a permission switch signal if detecting that all the dedicated timeslots that pass through the first node are available. The first node is further configured to cancel the use permission for the dedicated timeslot according to the permission switch signal. A remaining node other than the first node in the bufferless ring network is configured to obtain the use permission for the dedicated timeslot according to the permission switch signal. The remaining node is a node that needs to use the dedicated timeslot.

It can be learned that, by implementing the first aspect, each node that needs to send depended data may obtain the use permission for the dedicated timeslot by means of time division multiplexing, avoiding to allocate multiple timeslots to each node that needs to send depended data. In this way, a quantity of reserved dedicated timeslots can be reduced, and a data transmission delay is reduced.

In an optional implementation, a specific implementation in which the first node detects whether all dedicated timeslots that pass through the first node are available may include that the first node detects whether all the dedicated timeslots that pass through the first node are empty, and if the first node detects that all the dedicated timeslots that pass through the first node are empty, the first node detects that all the dedicated timeslots that pass through the first node are available.

By implementing this implementation, after the first node detects that the dedicated timeslot that pass through the first node is empty, it is proved that the first node can use the dedicated timeslot. To ensure that nodes that need to send the depended data use the dedicated timeslot in turn, after the first node detects that the dedicated timeslot is available to the first node, the first node may set the permission switch signal to transfer the use permission for the dedicated timeslot to another node.

In an optional implementation, a specific implementation in which the first node detects whether all dedicated timeslots that pass through the first node are available may include that the first node detects whether all the dedicated timeslots can be used to send data successfully, and if the first node detects that all the dedicated timeslots can be used to send data successfully, the first node detects that all the dedicated timeslots that pass through the first node are available.

By implementing this implementation, the first node has already successfully used all the dedicated timeslots to send the depended data. Therefore, to ensure that nodes that need to send the depended data use the dedicated timeslot in turn, after the first node detects that all the dedicated timeslots can be used to send the data successfully, the first node may set the permission switch signal to transfer the use permission for the dedicated timeslot to another node.

In an optional implementation, a specific implementation in which a remaining node obtains the use permission for the dedicated timeslot according to the permission switch signal may include that the remaining node circularly shifts a shift register corresponding to the remaining node by one bit in a preset direction when the remaining node detects the permission switch signal, where a width of the shift register is equal to a quantity of nodes that need to use the dedicated timeslot in the bufferless ring network, and if a preset bit of the shift register corresponding to the remaining node is a preset value, the remaining node obtains the use permission for the dedicated timeslot.

Setting the shift register to transfer the use permission for the dedicated timeslot facilitates timing closure.

In an optional implementation, that the remaining node obtains the use permission for the dedicated timeslot according to the permission switch signal includes that the remaining node determines whether a value of a counter corresponding to the remaining node is equal to a preset value when the remaining node detects the permission switch signal, where the preset value is a value obtained by subtracting one from a quantity of nodes that need to use the dedicated timeslot in the bufferless ring network, and if the value of the counter corresponding to the remaining node is the preset value, the remaining node sets the value of the counter corresponding to the remaining node to zero, and obtains the use permission for the dedicated timeslot, or if the value of the counter corresponding to the remaining node is not the preset value, the remaining node increases the value of the counter corresponding to the remaining node by one.

Setting the shift register to transfer the use permission for the dedicated timeslot facilitates timing closure. However, when more nodes need to use the dedicated timeslot, more logic is required for such encoding. For example, when 16 nodes need to use the dedicated timeslot, a 16-bit shifter needs to be added to each node. However, if a counter is set, only a 4-bit counter is required by each node. Therefore, setting the counter to transfer the use permission for the dedicated timeslot helps reduce a chip area and energy consumption.

In an optional implementation, a specific implementation in which the remaining node obtains the use permission for the dedicated timeslot according to the permission switch signal may include that the remaining node decreases a value of a counter corresponding to the remaining node by one to obtain a new counter value, and determines whether the new counter value is 0 when the remaining node detects the permission switch signal, and if the new counter value is 0, the remaining node obtains the use permission for the dedicated timeslot.

In an optional implementation, a specific implementation in which the first node cancels the use permission for the dedicated timeslot according to the permission switch signal may include that the first node circularly shifts a shift register corresponding to the first node by one bit in a preset direction when the first node receives the permission switch signal sent by a previous node, where a width of the shift register is equal to a quantity of nodes that need to use the dedicated timeslot in the bufferless ring network, and if a preset bit of the shift register corresponding to the first node is not a preset value, the first node cancels the use permission for the dedicated timeslot.

Setting the shift register to transfer the use permission for the dedicated timeslot facilitates timing closure. In addition, the first node transfers the use permission for the dedicated timeslot only when the first node receives the permission switch signal sent by the previous node. In this way, there may be two nodes that have the use permission for the dedicated timeslot during a period of time, but the two nodes do not use the dedicated timeslot at the same time, that is, the two nodes do not preempt the dedicated timeslot. This helps improve dedicated timeslot usage.

In an optional implementation, a specific implementation in which the first node cancels the use permission for the dedicated timeslot according to the permission switch signal may include that the first node determines whether a value of a counter corresponding to the first node is equal to a preset value when the first node receives the permission switch signal sent by a previous node, where the preset value is a value obtained by subtracting one from a quantity of nodes that need to use the dedicated timeslot in the bufferless ring network, and if the value of the counter corresponding to the first node is not the preset value, the first node increases the value of the counter corresponding to the first node by one, and cancels the use permission of the first node for the dedicated timeslot.

Setting the counter to transfer the use permission for the dedicated timeslot helps reduce a chip area and energy consumption. In addition, the first node transfers the use permission for the dedicated timeslot only when the first node receives the permission switch signal sent by the previous node. In this way, there may be two nodes that have the use permission for the dedicated timeslot during a period of time, but the two nodes do not use the dedicated timeslot at the same time, that is, the two nodes do not preempt the dedicated timeslot. This helps improve dedicated timeslot usage.

In an optional implementation, that the first node cancels the use permission for the dedicated timeslot according to the permission switch signal includes that the first node changes a value of a counter corresponding to the first node from 0 to a preset value when the first node detects the permission switch signal, where the preset value is a value obtained by subtracting one from a quantity of nodes that need to use the dedicated timeslot in the bufferless ring network, and cancels the use permission for the dedicated timeslot.

Setting the counter to transfer the use permission for the dedicated timeslot helps reduce a chip area and energy consumption.

In an optional implementation, the first node is further configured to clear the permission switch signal when receiving the permission switch signal sent by a previous node. Clearing the permission switch signal helps transfer smoothly the use permission for the dedicated timeslot in a next turn.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 2:
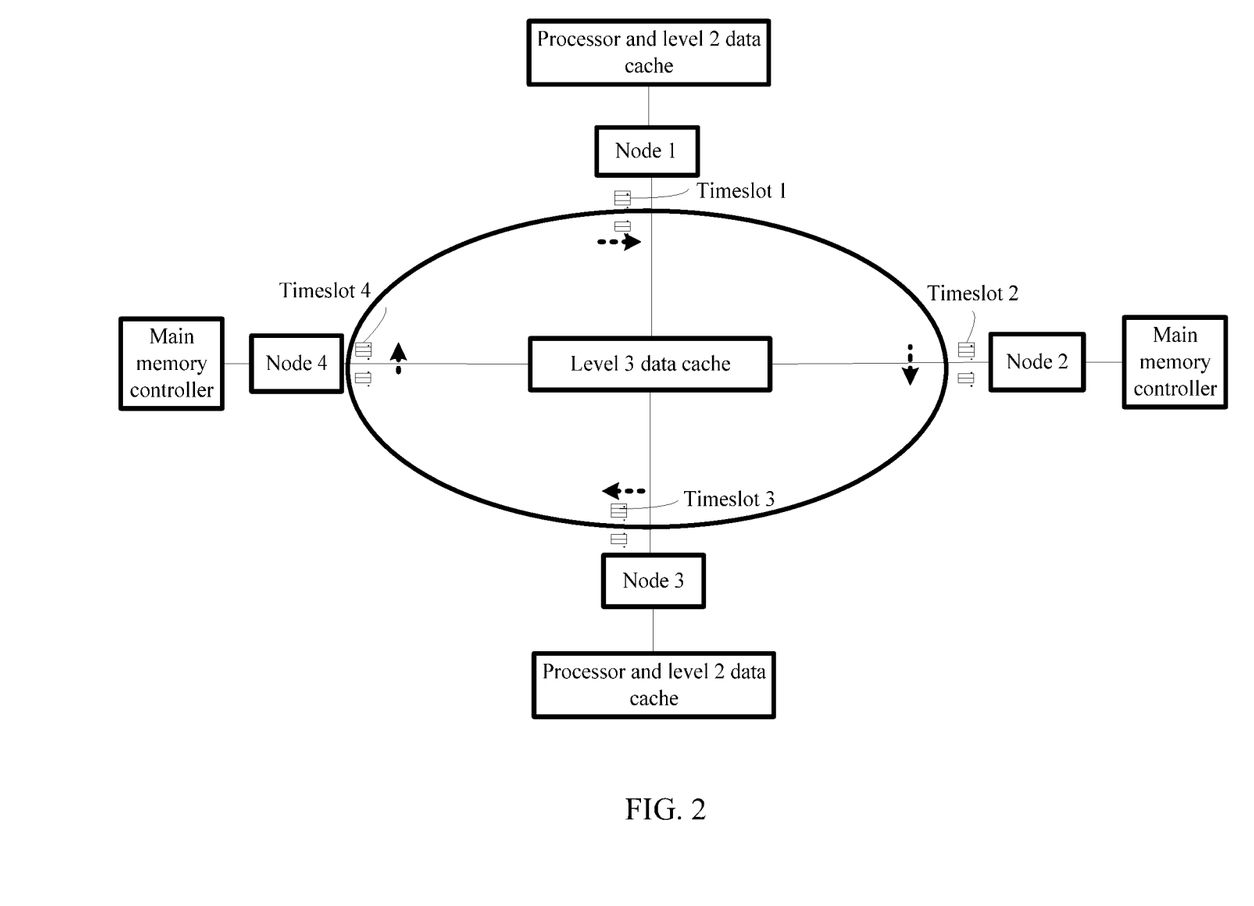
FIG. 2 is a schematic diagram of a network-on-a-chip (NOC)

In existing actual application, in a bufferless ring network, interdependent data usually needs to be transferred between nodes. For example, the bufferless ring network may be a NOC, and in the NOC, interdependent data usually needs to be transferred between nodes. FIG. 2 is a schematic diagram of a NOC. As shown in FIG. 2, the NOC includes node 1 to node 4. A level 3 data cache, a level 2 data cache, a processor, and a main memory controller may be referred to as modules. These modules are connected using the NOC. The NOC is in charge of transmitting a message among the modules. The main memory controller needs to send an HSnp message (the HSnp message is a snoop message that is sent by the main memory controller to the level 3 data cache) to the level 3 data cache to maintain data consistency. An LSnp message (the LSnp message refers to a snoop message that is sent by the level 3 data cache to the level 2 data cache) needs to be sent between the level 3 data cache and the level 2 data cache to maintain data consistency. Completion of sending the HSnp message depends on completion of sending the LSnp message (that is, the LSnp message is depended data). Therefore, both the LSnp message and the HSnp message that are interdependent with each other are transmitted on the NOC shown in FIG. 2. In an actual application, to ensure successful sending of the LSnp message, the NOC reserves at least one dedicated timeslot for each node that needs to send the LSnp message. If multiple nodes on the NOC need to send the depended data, the NOC needs to further reserve multiple dedicated timeslots to transmit the depended data. More reserved dedicated timeslots indicate fewer common timeslots. Consequently, a data transmission delay is increased.

To reduce a quantity of reserved dedicated timeslots and reduce a data transmission delay, an embodiment of the present disclosure provides a bufferless ring network. The bufferless ring network may be an NOC or another type of bufferless ring network, such as a bufferless ring network designed for connecting multiple sockets on a printed circuit board (PCB). This is not limited in this embodiment of the present disclosure.

The following further describes the bufferless ring network provided in this embodiment of the present disclosure.

The bufferless ring network provided in this embodiment of the present disclosure includes at least two nodes and at least two timeslots. The at least two timeslots includes a dedicated timeslot, and a first node in the bufferless ring network has use permission for the dedicated timeslot. The first node is configured to, in a state of having the use permission for the dedicated timeslot, detect whether all dedicated timeslots that pass through the first node are available. The first node is further configured to set a permission switch signal if detecting that all the dedicated timeslots that pass through the first node are available, and cancel the use permission for the dedicated timeslot according to the permission switch signal. A remaining node other than the first node in the bufferless ring network is configured to obtain the use permission for the dedicated timeslot according to the permission switch signal. The remaining node is a node that needs to use the dedicated timeslot.

In this embodiment of the present disclosure, the dedicated timeslot is a timeslot used to send only depended data. The dedicated timeslot is available only to a node that has use permission for the dedicated timeslot. Therefore, the first node in the bufferless ring network has the use permission for the dedicated timeslot, and the first node can use the dedicated timeslot to send the depended data. The remaining node other than the first node in the bufferless ring network has no use permission for the dedicated timeslot, and the remaining node cannot use the dedicated timeslot to send the depended data.

Figure 3:
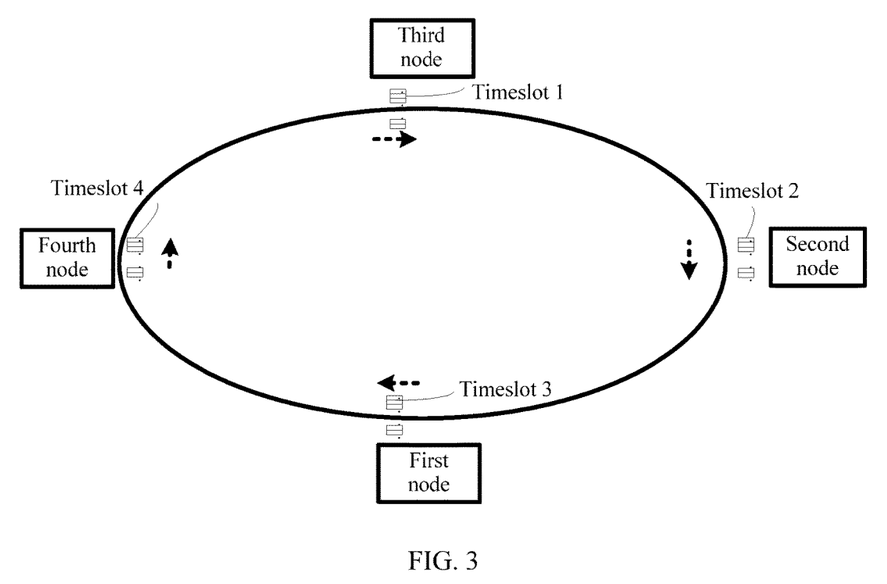
FIG. 3, FIG. 4, FIG. 5, FIG. 6, FIG. 7, FIG. 8, FIG. 9, FIG. 10 and FIG. 11 are schematic diagrams of a bufferless ring network according to an embodiment of the present disclosure.

For example, as shown in FIG. 3, FIG. 3 shows an example in which a bufferless ring network includes four nodes and four timeslots, where two of the four timeslots are dedicated timeslots. A timeslot 3 and a timeslot 2 are the dedicated timeslots. A first node has use permission for the timeslot 3 and the timeslot 2. Therefore, the first node can use the timeslot 3 and the timeslot 2 to send depended data. A second node to a fourth node are remaining nodes. The second node to the fourth node have no use permission for the timeslot 3 and the timeslot 2. Therefore, the second node to the fourth node cannot use the timeslot 3 and the timeslot 2. A timeslot 1 and a timeslot 4 are common timeslots. That is, all the nodes can use the timeslot 1 and the timeslot 4 to send any data.

When the first node is in a state of having the use permission for the timeslot 3 and the timeslot 2, the timeslot 3 and the timeslot 2 may be transmitting data added by another node. Therefore, when the first node is in the state of having the use permission for the timeslot 3 and the timeslot 2, the first node needs to detect whether both the timeslot 3 and the timeslot 2 that pass through the first node are available to the first node. If detecting that both the timeslot 3 and the timeslot 2 that pass through the first node are available to the first node, the first node sets a permission switch signal. For example, when the timeslot 3 passes through the first node, the first node detects that the timeslot 3 is available, the first node stops detecting whether the timeslot 3 is available, and continues to detect whether the timeslot 2 that passes through the first node is available. If detecting that the timeslot 2 that passes through the first node is unavailable, the first node continues detecting whether the timeslot 2 that passes through the first node is available until the first node detects that the timeslot 2 that passes through the first node is available, and the first node sets the permission switch signal. The permission switch signal is used to transfer the use permission for the dedicated timeslot from the first node to another node that needs to send the depended data such that nodes that need to send the depended data use the dedicated timeslot to send the depended data in turn.

In an optional implementation, a specific implementation in which the first node detects whether all dedicated timeslots that pass through the first node are available may include that the first node detects whether all the dedicated timeslots that pass through the first node are empty, and if the first node detects that all the dedicated timeslots that pass through the first node are empty, the first node detects that all the dedicated timeslots that pass through the first node are available.

For example, if the first node detects that the timeslot 3 that passes is empty, the first node no longer detects whether the timeslot 3 that passes is empty, and continues to detect whether the timeslot 2 that passes through the first node is empty. If detecting that the timeslot 2 that passes through the first node is not empty, the first node continues detecting whether the timeslot 2 that passes through the first node is empty until the first node detects that the timeslot 2 that passes through the first node is empty, and the first node sets the permission switch signal.

By implementing the implementation, after the first node detects that the timeslot 3 and the timeslot 2 that pass through the first node are empty, it is proved that the first node can use the timeslot 3 and the timeslot 2. To ensure that nodes that need to send the depended data use the dedicated timeslot in turn, after the first node detects that the dedicated timeslot is available to the first node, the first node may set the permission switch signal to transfer the use permission for the dedicated timeslot to another node.

In an optional implementation, a specific implementation in which the first node detects whether all dedicated timeslots that pass through the first node are available may include that the first node detects whether all the dedicated timeslots can be used to send data successfully, and if the first node detects that all the dedicated timeslots can be used to send data successfully, the first node detects that all the dedicated timeslots that pass through the first node are available.

For example, if the timeslot 3 passes through the first node, the first node sends depended data using the timeslot 3. If detecting that the timeslot 3 can be used to send the depended data successfully, the first node determines that the timeslot 3 is available. Likewise, if the timeslot 2 passes through the first node, the first node uses the timeslot 2 to send depended data. If detecting that the timeslot 2 can be used to send the depended data successfully, the first node determines that the timeslot 2 is available. After the first node determines that both the timeslot 2 and the timeslot 3 are available, the first node sets the permission switch signal.

By implementing this implementation, the first node has already successfully used all the dedicated timeslots to send the depended data. Therefore, to ensure that nodes that need to send the depended data use the dedicated timeslot in turn, after the first node detects that all the dedicated timeslots can be used to send the data successfully, the first node may set the permission switch signal to transfer the use permission for the dedicated timeslot to another node.

It can be learned that, using the bufferless ring network described in FIG. 3, after the first node uses the timeslot 3 and the timeslot 2, the first node may transfer the use permission for the timeslot 3 and the timeslot 2 to another node (for example, the second node) according to the permission switch signal that is set by the first node. Likewise, after using the timeslot 3 and the timeslot 2, the second node may transfer the use permission for the timeslot 3 and the timeslot 2 to a third node according to a permission switch signal that is set by the second node. After using the timeslot 3 and the timeslot 2, the third node may transfer the use permission for the timeslot 3 and the timeslot 2 to the fourth node according to a permission switch signal that is set by the third node. Therefore, each node that needs to send the depended data may obtain the use permission for the dedicated timeslot by means of time division multiplexing, avoiding to allocate multiple timeslots to each node that needs to send the depended data. In this way, a quantity of reserved dedicated timeslots can be reduced, and a data transmission delay is reduced.

In an optional implementation, after detecting that all the dedicated timeslots that pass through the first node are available, the first node sets the permission switch signal when a timeslot passes through the first node in a next clock circle. For example, as shown in FIG. 3, after the first node first detects that the timeslot 3 is available, and then detects that the timeslot 2 is available, when the timeslot 1 passes through the first node, the first node sets the permission switch signal, and adds the permission switch signal to the timeslot 1.

For specific implementation of this implementation, refer to descriptions corresponding to the following application scenario 1.

In an optional implementation, after detecting that all the dedicated timeslots that pass through the first node are available, the first node sets the permission switch signal in a current clock circle. For example, as shown in FIG. 3, after the first node first detects that the timeslot 3 is available, and then detects that the timeslot 2 is available, the first node sets the permission switch signal, and adds the permission switch signal to the timeslot 2.

In an optional implementation, a specific implementation in which a remaining node obtains the use permission for the dedicated timeslot according to the permission switch signal may include that the remaining node circularly shifts a shift register corresponding to the remaining node by one bit in a preset direction when the remaining node detects the permission switch signal, where a width of the shift register is equal to a quantity of nodes that need to use the dedicated timeslot in the bufferless ring network, and if a preset bit of the shift register corresponding to the remaining node is a preset value, the remaining node obtains the use permission for the dedicated timeslot.

For specific implementation of this implementation, refer to descriptions corresponding to the following application scenario 1. Setting the shift register to transfer the use permission for the dedicated timeslot facilitates timing closure.

In an optional implementation, a specific implementation in which the first node cancels the use permission for the dedicated timeslot according to the permission switch signal may include that the first node circularly shifts a shift register corresponding to the first node by one bit in a preset direction when the first node receives the permission switch signal sent by a previous node, where a width of the shift register is equal to a quantity of nodes that need to use the dedicated timeslot in the bufferless ring network, and if a preset bit of the shift register corresponding to the first node is not a preset value, the first node cancels the use permission for the dedicated timeslot.

For specific implementation of this implementation, refer to descriptions corresponding to the following application scenario 1. Setting the shift register to transfer the use permission for the dedicated timeslot facilitates timing closure. In addition, the first node transfers the use permission for the dedicated timeslot only when the first node receives the permission switch signal sent by the previous node. In this way, there may be two nodes that have the use permission for the dedicated timeslot during a period of time, but the two nodes do not use the dedicated timeslot at the same time, that is, the two nodes do not preempt the dedicated timeslot. This helps improve dedicated timeslot usage.

In an optional implementation, the first node may cancel the use permission for the dedicated timeslot immediately after setting the permission switch signal. That is, after setting the permission switch signal, the first node may immediately shift the shift register corresponding to the first node by one bit in the preset direction, and if a preset bit of the shift register corresponding to the first node is not a preset value, the first node cancels the use permission for the dedicated timeslot.

In an optional implementation, the first node is further configured to clear the permission switch signal when receiving the permission switch signal sent by a previous node.

For specific implementation of this implementation, refer to descriptions corresponding to the following application scenario 1.

For ease of understanding this embodiment of the present disclosure, the following further describes this embodiment of the present disclosure with reference to FIG. 4 to FIG. 8 and application scenario 1.

Figure 4:
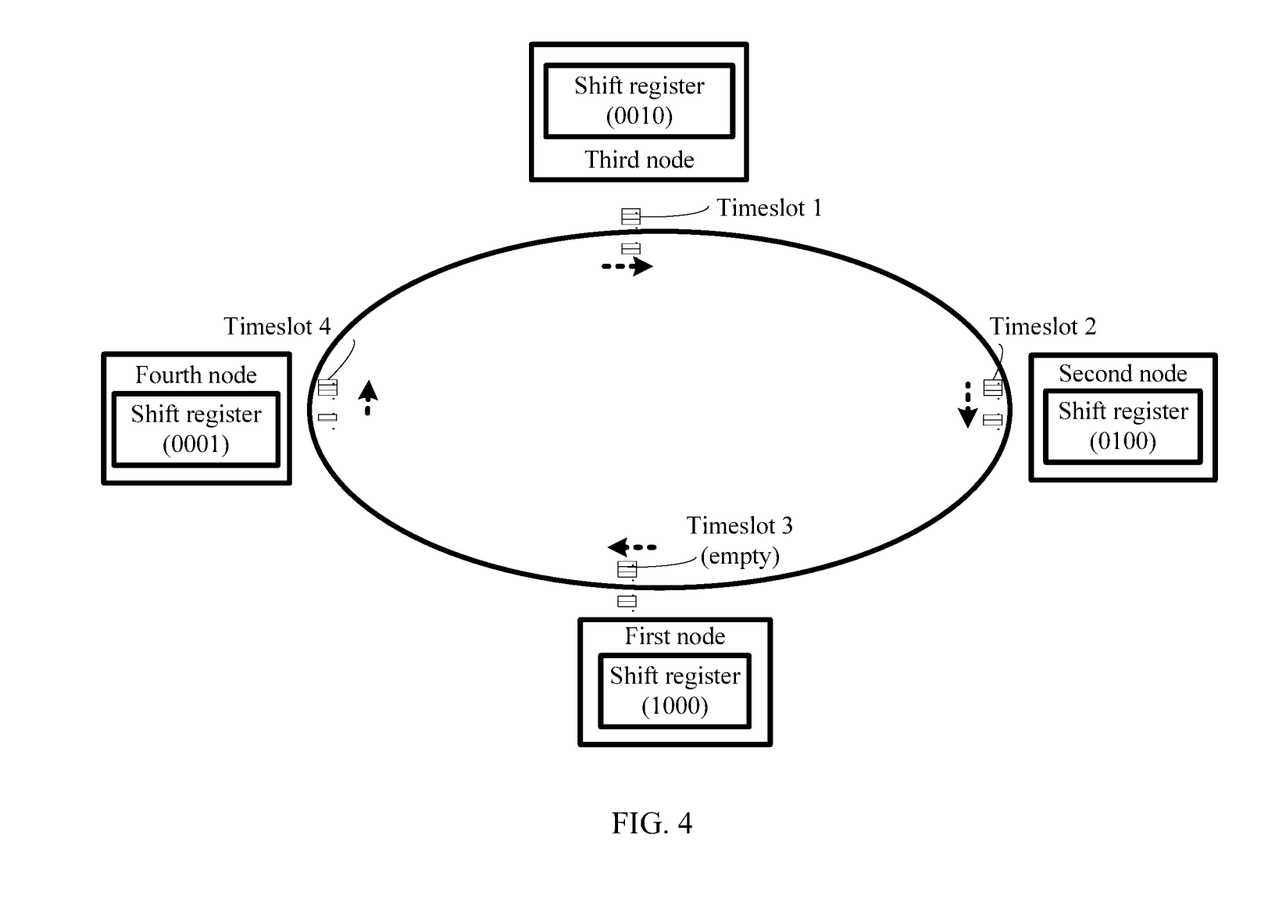

Application scenario 1: As shown in FIG. 4, a first node to a fourth node all are nodes that need to send depended data. A timeslot 3 and a timeslot 2 are dedicated timeslots, and a timeslot 1 and a timeslot 4 are common timeslots. A shift register is added to each node that needs to send the depended data (that is, a node that needs to use a dedicated timeslot) in a bufferless ring network. A width of the shift register is equal to a quantity of nodes that need to use the dedicated timeslot in the bufferless ring network (that is, four bits). In addition, each shift register has a different default value. As shown in FIG. 4, a default value of a shift register corresponding to the first node is 1000, a default value of a shift register corresponding to a second node is 0100, a default value of a shift register corresponding to a third node is 0010, and a default value of a shift register corresponding to the fourth node is 0001. An example in which a preset bit of a shift register is a leftmost bit, and a preset value is 1 is used in application scenario 1. When the leftmost bit of the shift register is 1, a node corresponding to the shift register has use permission for a dedicated timeslot. Therefore, as shown in FIG. 4, the first node has the use permission for the dedicated timeslot.

Figure 5:
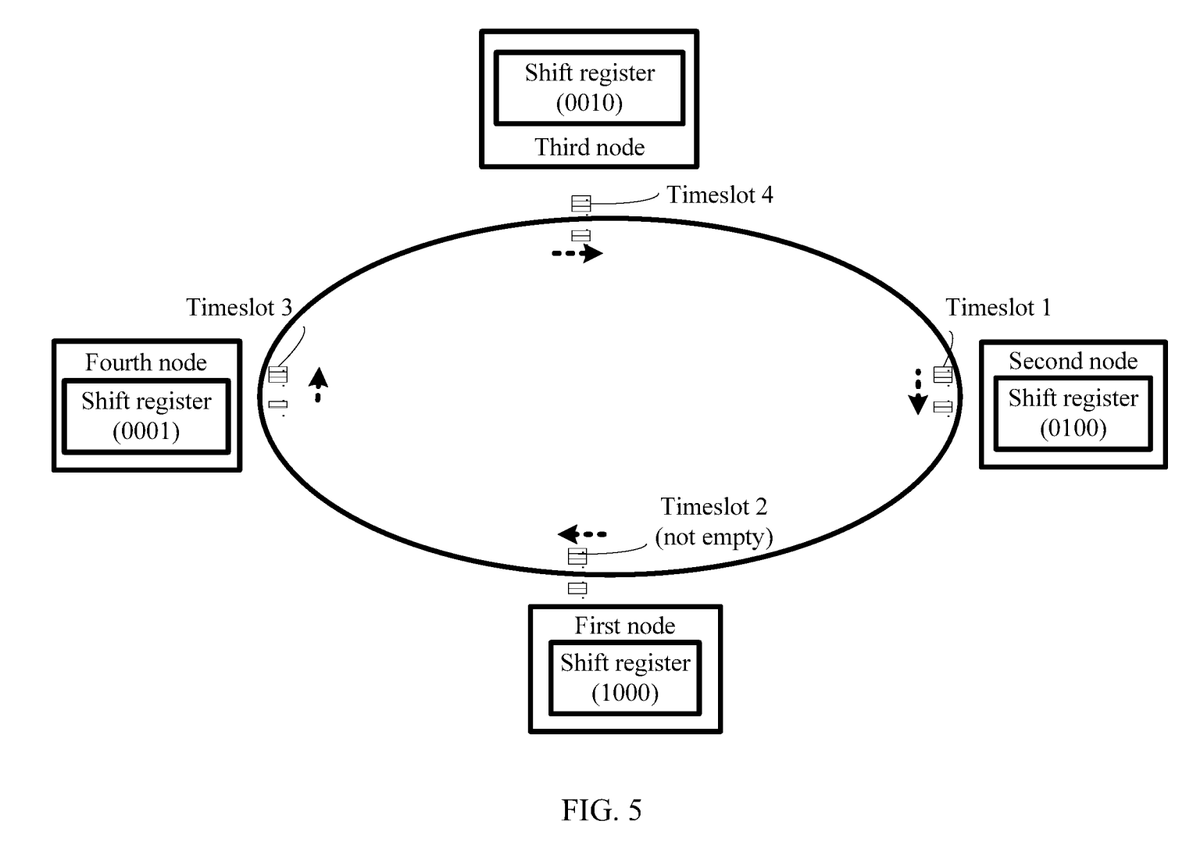
Figure 6:
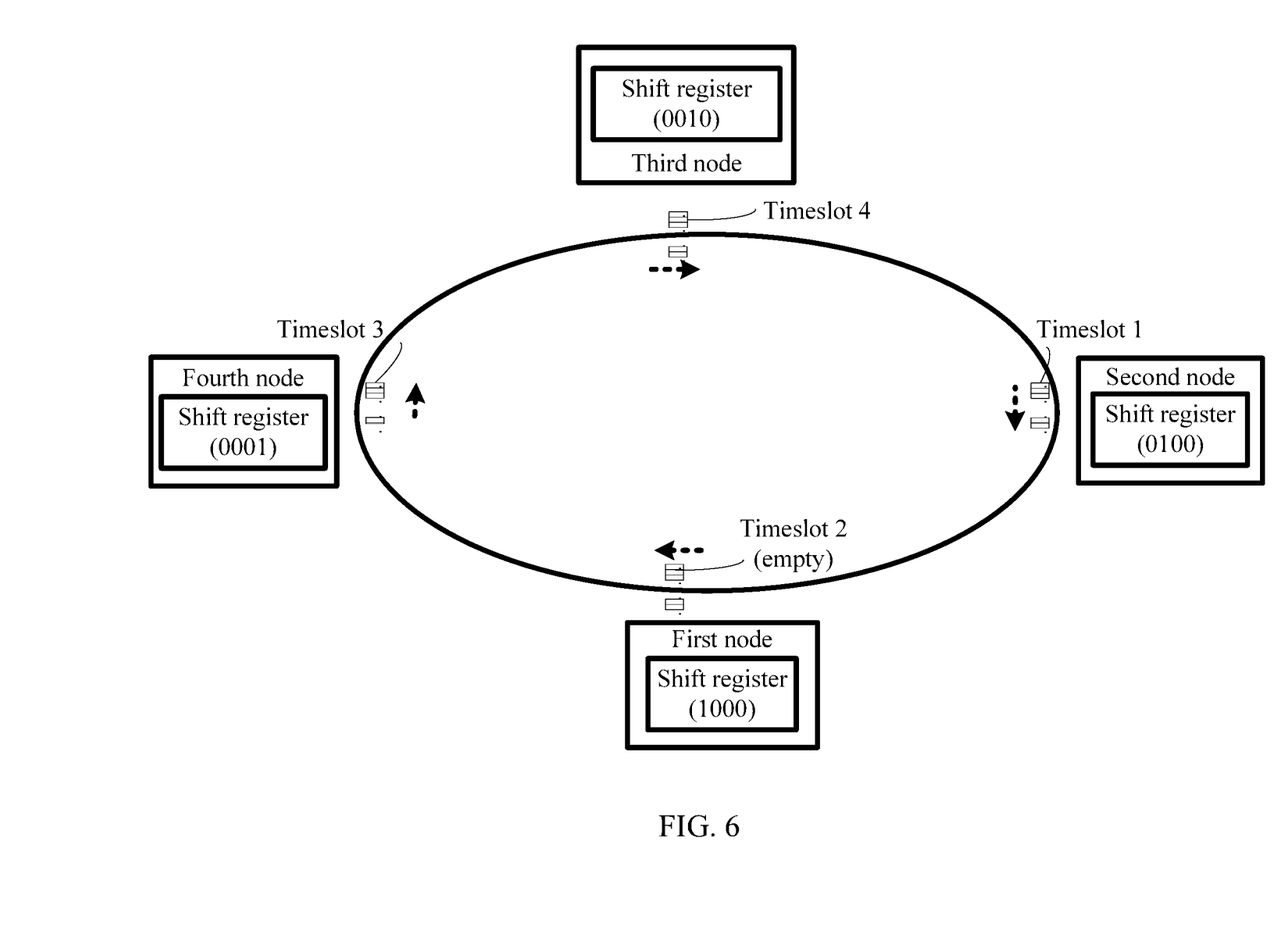
Figure 7:
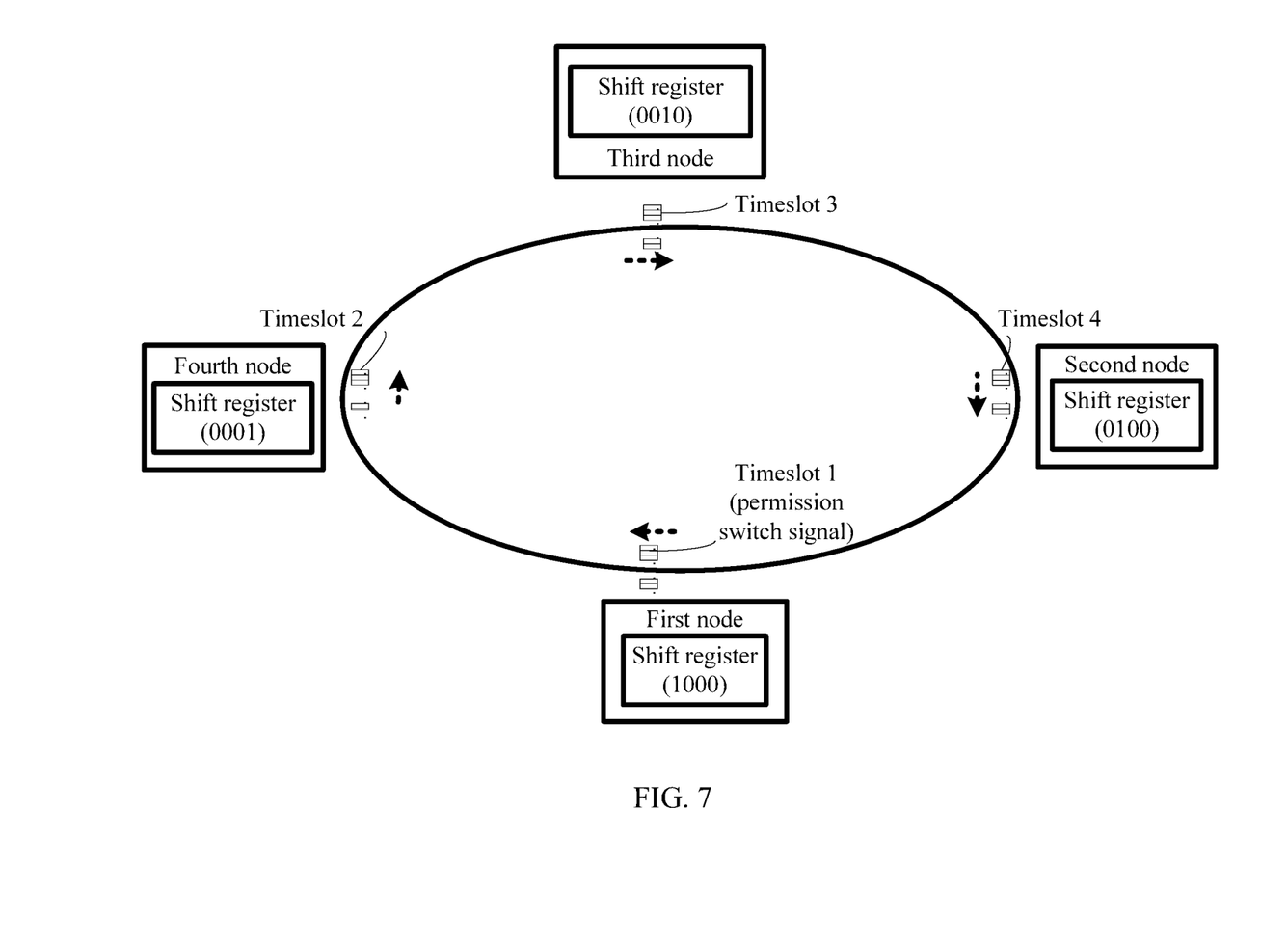

As shown in FIG. 4, when the first node detects that the timeslot 3 passes through the first node, the first node detects whether the timeslot 3 is empty. If the first node detects that the timeslot 3 is empty, the first node stops detecting whether the timeslot 3 is empty. As shown in FIG. 5, when the first node detects that the timeslot 2 passes through the first node, the first node detects whether the timeslot 2 is empty. Because the first node detects that the timeslot 2 is not empty, the first node considers that the first node does not use all of the dedicated timeslots. As shown in FIG. 6, when the timeslot 2 passes through the first node again, the first node continues detecting whether the timeslot 2 is empty. Because the timeslot 2 is empty, as shown in FIG. 7, after the first node receives the timeslot 1, the first node sets a permission switch signal, and adds the permission switch signal to the timeslot 1.

Figure 8:
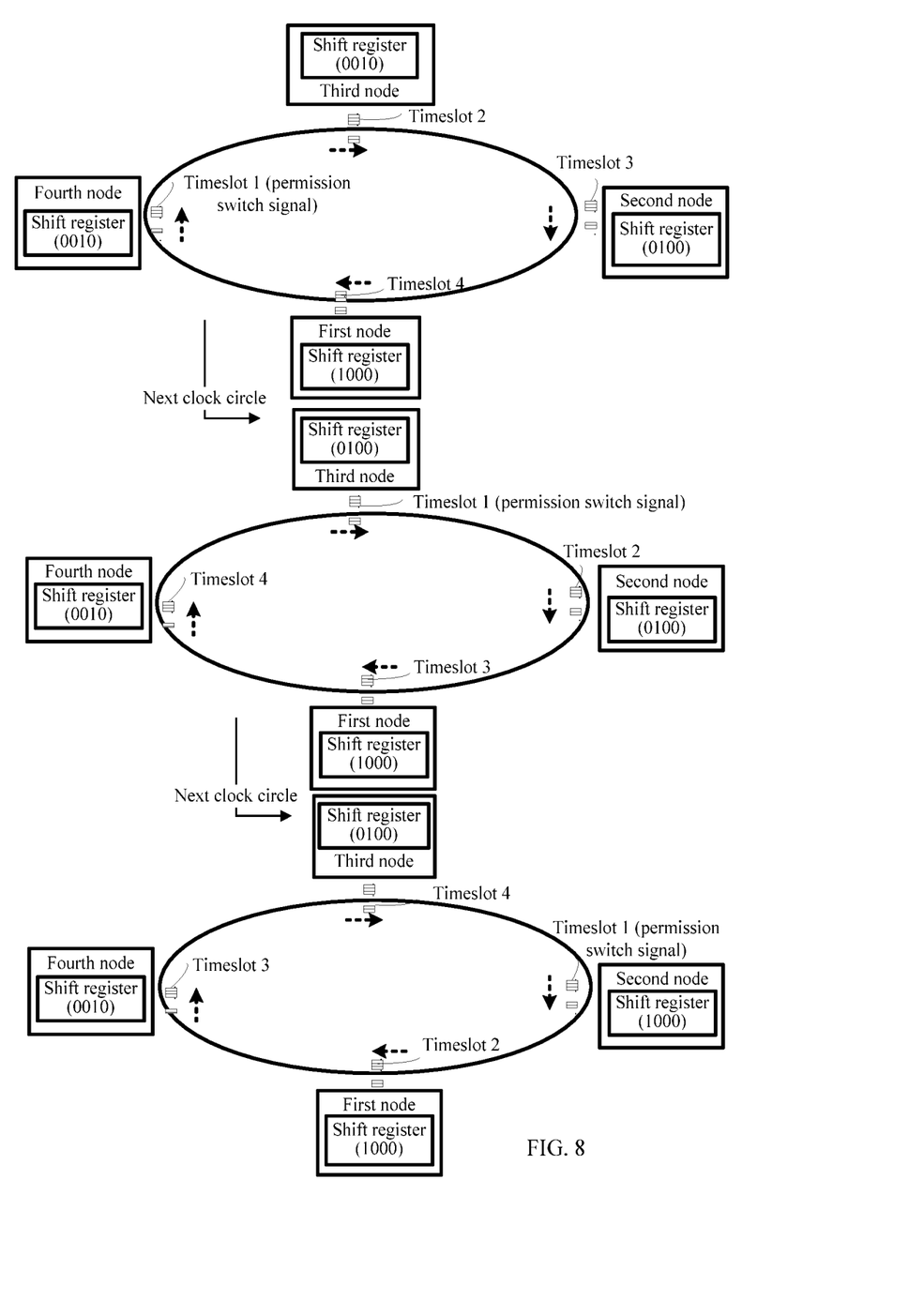

As shown in FIG. 8, after receiving the permission switch signal, the second node, the third node, and the fourth node all circularly shift corresponding shift registers one bit towards the left. Because the leftmost bit of the shift register corresponding to the second node is 1, the second node has the use permission for the dedicated timeslot. After receiving the timeslot 1 that carries the permission switch signal and that is sent by the second node, the first node circularly shifts the shift register corresponding to the first node by one bit towards the left. Because the leftmost bit of the shift register corresponding to the first node is not 1, the first node cancels the use permission for the dedicated timeslot.

After the first node receives the permission switch signal sent by the second node, the first node clears the permission switch signal.

After the second node obtains the use permission for the dedicated timeslot, the second node also performs the step performed when the first node has the use permission for the dedicated timeslot such that after using the dedicated timeslot, the second node transfers the use permission for the dedicated timeslot to a next node, and nodes that need to use the dedicated timeslot in the bufferless ring network use the dedicated timeslot in turn.

In an optional implementation, a specific implementation in which the remaining node obtains the use permission for the dedicated timeslot according to the permission switch signal may include that the remaining node determines whether a value of a counter corresponding to the remaining node is equal to a preset value when the remaining node detects the permission switch signal, where the preset value is a value obtained by subtracting one from a quantity of nodes that need to use the dedicated timeslot in the bufferless ring network, and if the value of the counter corresponding to the remaining node is the preset value, the remaining node sets the value of the counter corresponding to the remaining node to zero, and obtains the use permission for the dedicated timeslot, or if the value of the counter corresponding to the remaining node is not the preset value, the remaining node increases the value of the counter corresponding to the remaining node by one.

For specific implementation of this implementation, refer to descriptions corresponding to the following application scenario 2.

Setting the shift register to transfer the use permission for the dedicated timeslot facilitates timing closure. However, when more nodes need to use the dedicated timeslot, more logic is required for such encoding. For example, when 16 nodes need to use the dedicated timeslot, a 16-bit shifter needs to be added to each node. However, if a counter is set, only a 4-bit counter is required by each node. Therefore, setting the counter to transfer the use permission for the dedicated timeslot helps reduce a chip area and energy consumption.

In an optional implementation, a specific implementation in which the remaining node obtains the use permission for the dedicated timeslot according to the permission switch signal may include that the remaining node decreases a value of a counter corresponding to the remaining node by one to obtain a new counter value, and determines whether the new counter value is 0 when the remaining node detects the permission switch signal, and if the new counter value is 0, the remaining node obtains the use permission for the dedicated timeslot.

Setting the counter to transfer the use permission for the dedicated timeslot helps reduce a chip area and energy consumption.

In an optional implementation, transferring the use permission for the dedicated timeslot using only the counter may not facilitate timing closure. Therefore, a grant signal may be used together to transfer the use permission for the dedicated timeslot. That is, when detecting that the value of the counter is 0, the remaining node sets the grant signal in a next clock circle.

In an optional implementation, that the first node cancels the use permission for the dedicated timeslot according to the permission switch signal includes that the first node determines whether a value of a counter corresponding to the first node is equal to a preset value when the first node receives the permission switch signal sent by a previous node, where the preset value is a value obtained by subtracting one from a quantity of nodes that need to use the dedicated timeslot in the bufferless ring network, and if the value of the counter corresponding to the first node is not the preset value, the first node increases the value of the counter corresponding to the first node by one, and cancels the use permission of the first node for the dedicated timeslot.

For specific implementation of this implementation, refer to descriptions corresponding to the following application scenario 2. Setting the counter to transfer the use permission for the dedicated timeslot helps reduce a chip area and energy consumption. In addition, the first node transfers the use permission for the dedicated timeslot only when the first node receives the permission switch signal sent by the previous node. In this way, there may be two nodes that have the use permission for the dedicated timeslot during a period of time, but the two nodes do not use the dedicated timeslot at the same time, that is, the two nodes do not preempt the dedicated timeslot. This helps improve dedicated timeslot usage.

In an optional implementation, that the first node cancels the use permission for the dedicated timeslot according to the permission switch signal includes that the first node changes a value of a counter corresponding to the first node from 0 to a preset value when the first node detects the permission switch signal, where the preset value is a value obtained by subtracting one from a quantity of nodes that need to use the dedicated timeslot in the bufferless ring network, and cancels the use permission for the dedicated timeslot.

Setting the counter to transfer the use permission for the dedicated timeslot helps reduce a chip area and energy consumption.

Figure 9:
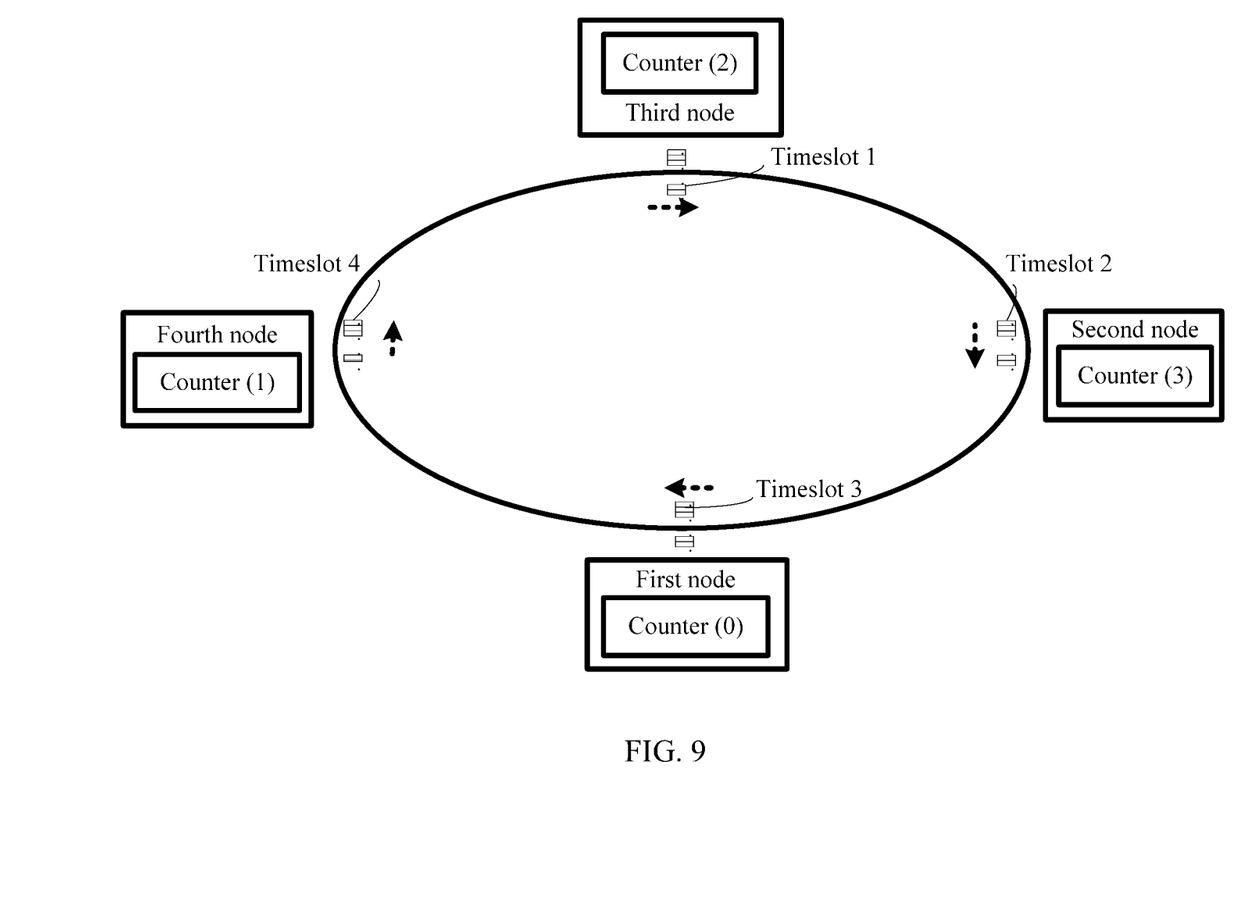
Figure 10:
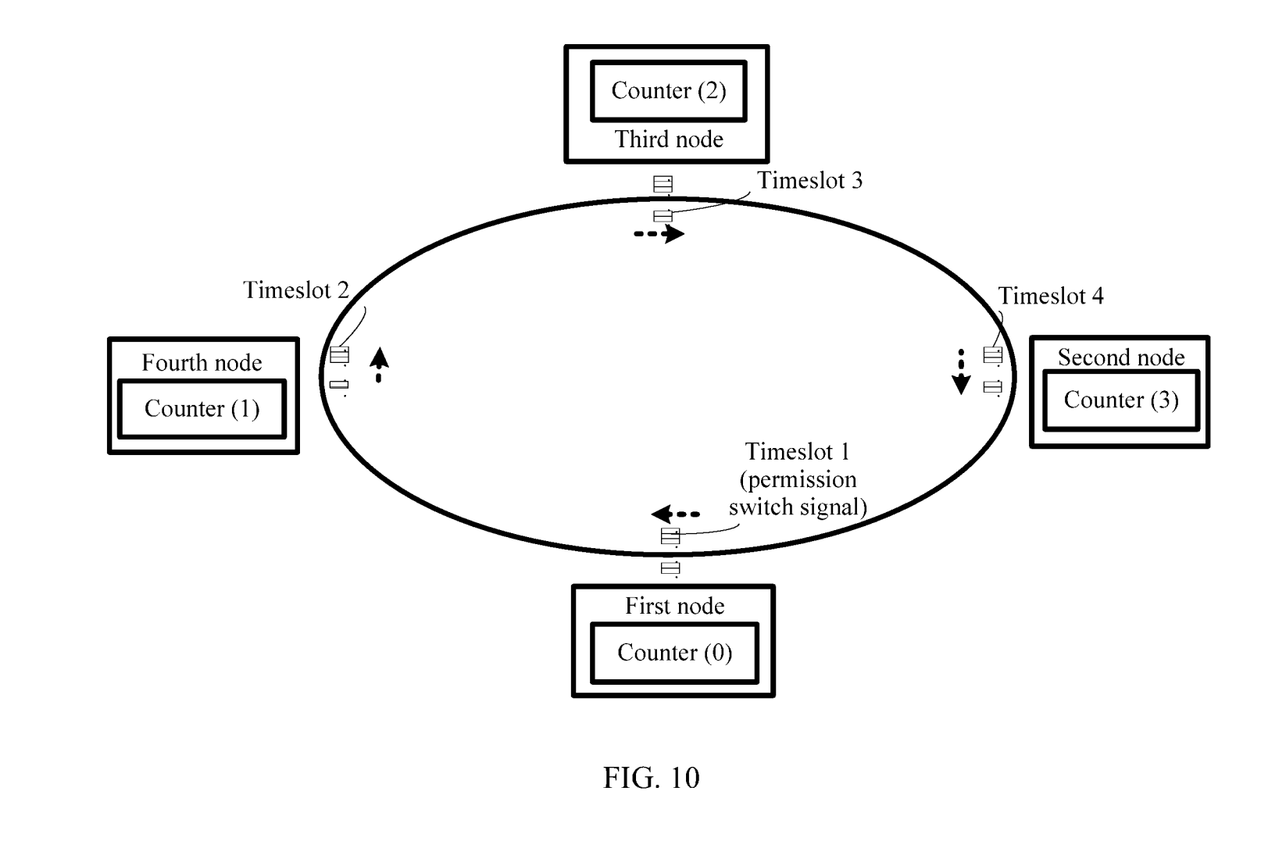
Figure 11:
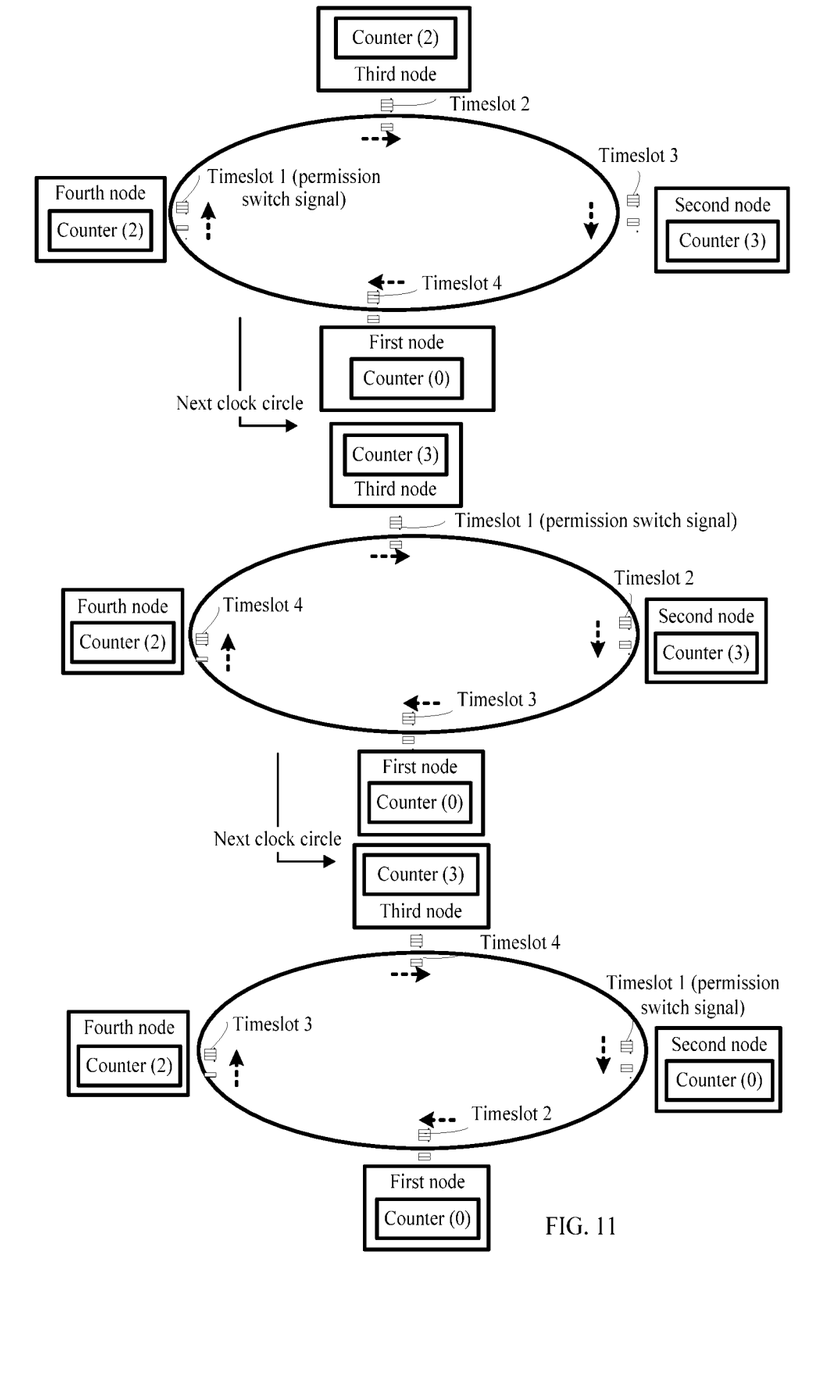

For ease of understanding this embodiment of the present disclosure, the following further describes this embodiment of the present disclosure with reference to FIG. 9 to FIG. 11 and application scenario 2.

Application scenario 2: As shown in FIG. 9, a first node to a fourth node all are nodes that need to send depended data. A timeslot 3 and a timeslot 2 are dedicated timeslots, and a timeslot 1 and a timeslot 4 are common timeslots. A counter is added to each node that needs to send the depended data (that is, a node that needs to use a dedicated timeslot) in a bufferless ring network. As shown in FIG. 9, a value of a counter corresponding to the first node is 0, a value of a counter corresponding to a second node is 3, a value of a counter corresponding to a third node is 2, and a value of a counter corresponding to the fourth node is 1. When a value of a counter is 0, a corresponding node has use permission for a dedicated timeslot. Therefore, as shown in FIG. 9, the first node has the use permission for the dedicated timeslot.

As shown in FIG. 10, after the first node first detects that the timeslot 3 is available, and then detects that the timeslot 2 is available, when the timeslot 1 passes through the first node, the first node sets the permission switch signal, and adds the permission switch signal to the timeslot 1.

As shown in FIG. 11, the value of the counter corresponding to the third node and the value of the counter corresponding to the fourth node are not a preset value (the preset value is a value obtained by subtracting one from a quantity of nodes that need to use the dedicated timeslot in the bufferless ring network, that is, 3). Therefore, after receiving the permission switch signal, both the third node and the fourth node increase the values of the counters by one. The value of the counter corresponding to the second node is 3, and after receiving the permission switch signal, the second node sets the value of the counter corresponding to the second node to 0 to obtain the use permission for the dedicated timeslot. After receiving the timeslot 1 that carries the permission switch signal and that is sent by the second node, the first node increases the value of the counter corresponding to the first node by one. Because the value of the counter corresponding to the first node is not 0, the first node cancels the use permission for the dedicated timeslot.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A bufferless ring network, comprising at least two nodes and at least two timeslots, wherein the at least two timeslots comprise a dedicated timeslot, wherein a first node in the bufferless ring network has use permission for the dedicated timeslot, wherein the first node is in a state of having the use permission for the dedicated timeslot, and wherein the first node is configured to:
   detect whether all dedicated timeslots that pass through the first node are available;
   set a permission switch signal when detecting that all the dedicated timeslots that pass through the first node are available; and
   cancel the use permission for the dedicated timeslot according to the permission switch signal,
   wherein a remaining node other than the first node in the bufferless ring network is configured to obtain the use permission for the dedicated timeslot according to the permission switch signal,
   wherein the remaining node comprises a node that needs to use the dedicated timeslot,
   wherein when obtaining the use permission, the remaining node is further configured to circularly shift a shift register corresponding to the remaining node by one bit in a preset direction when the remaining node detects the permission switch signal, and
   wherein a width of the shift register is equal to a quantity of nodes that need to use the dedicated timeslot in the bufferless ring network.

2. The bufferless ring network of claim 1, wherein when detecting whether all the dedicated timeslots that pass through the first node are available, the first node is further configured to:
   detect whether all the dedicated timeslots that pass through the first node are empty; and
   detect that all the dedicated timeslots that pass through the first node are available when all the dedicated timeslots that pass through the first node are empty.

3. The bufferless ring network of claim 1, wherein when detecting whether all the dedicated timeslots that pass through the first node are available, the first node is further configured to:
   detect whether all the dedicated timeslots can be used to send data successfully; and
   detect that all the dedicated timeslots that pass through the first node are available when all the dedicated timeslots can be used to send the data successfully.

4. The bufferless ring network of claim 1, wherein when obtaining the use permission, the remaining node is further configured to obtain the use permission for the dedicated timeslot when a preset bit of the shift register corresponding to the remaining node comprises a preset value.

5. The bufferless ring network of claim 1, wherein when obtaining the use permission, the remaining node is further configured to:
   determine whether a value of a counter corresponding to the remaining node is equal to a preset value when the remaining node detects the permission switch signal, wherein the preset value comprises a value obtained by subtracting one from a quantity of nodes that need to use the dedicated timeslot in the bufferless ring network;
   set the value of the counter corresponding to the remaining node to zero, and obtain the use permission for the dedicated timeslot when the value of the counter corresponding to the remaining node comprises the preset value; and
   increase the value of the counter corresponding to the remaining node by one when the value of the counter corresponding to the remaining node does not comprises the preset value.

6. The bufferless ring network of claim 1, wherein when cancelling the use permission for the dedicated timeslot, the first node is further configured to:
- circularly shift a shift register corresponding to the first node by one bit in a preset direction when the first node receives the permission switch signal from a previous node, wherein a width of the shift register is equal to a quantity of nodes that need to use the dedicated timeslot in the bufferless ring network; and
- cancel the use permission for the dedicated timeslot when a preset bit of the shift register corresponding to the first node does not comprises a preset value.

7. The bufferless ring network of claim 1, wherein when cancelling the use permission, the first node is further configured to:
- determine whether a value of a counter corresponding to the first node is equal to a preset value when the first node receives the permission switch signal from a previous node, wherein the preset value comprises a value obtained by subtracting one from a quantity of nodes that need to use the dedicated timeslot in the bufferless ring network; and
- increase the value of the counter corresponding to the first node by one, and cancel the use permission of the first node for the dedicated timeslot when the value of the counter corresponding to the first node does not comprises the preset value.

8. The bufferless ring network of claim 1, wherein the first node is further configured to clear the permission switch signal when receiving the permission switch signal from a previous node.

\* \* \* \* \*